US012420772B2

(12) United States Patent
Idogawa et al.

(10) Patent No.: US 12,420,772 B2
(45) Date of Patent: Sep. 23, 2025

(54) HYBRID ELECTRIC VEHICLE

(71) Applicant: TOYOTA JIDOSHA KABUSHIKI KAISHA, Aichi-ken (JP)

(72) Inventors: Masanao Idogawa, Nagoya (JP); Hirokazu Andoh, Seto (JP); Takahiro Uchida, Okazaki (JP); Yoshikazu Asami, Gotemba (JP); Hidekazu Nawata, Toyota (JP); Jumpei Nasu, Nisshin (JP); Sohichi Imai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 352 days.

(21) Appl. No.: 18/172,320

(22) Filed: Feb. 22, 2023

(65) Prior Publication Data

US 2023/0347863 A1 Nov. 2, 2023

(30) Foreign Application Priority Data

Apr. 28, 2022 (JP) ................. 2022-074860

(51) Int. Cl.
*B60W 20/10* (2016.01)
*B60W 20/16* (2016.01)
(Continued)

(52) U.S. Cl.
CPC ............ *B60W 20/10* (2013.01); *B60W 20/16* (2016.01); *B60W 20/40* (2013.01); *F01N 3/20* (2013.01);
(Continued)

(58) Field of Classification Search
CPC ...... B60W 20/10; B60W 20/16; B60W 20/40; B60W 30/1882; B60W 2710/0644; B60W 2710/0666; B60W 10/06; B60W 10/08; F01N 3/20; F01N 3/2006; B60K 6/24; B60K 6/26; B60K 6/445; B60Y 2200/92; B60Y 2300/474; Y02T 10/62; F02D 29/02; F02D 29/06; F02D 31/001; F02D 41/0002; F02D 41/08; F02D 41/1401;
(Continued)

(56) References Cited

U.S. PATENT DOCUMENTS 5,775,099 A * 7/1998 Ito .................. F01N 3/0842
123/430
6,116,208 A * 9/2000 Nishimura .......... F02D 41/3029
123/295
(Continued)

FOREIGN PATENT DOCUMENTS

JP 2002-235646 A 8/2002
JP 2005-120942 A 5/2005
(Continued)

*Primary Examiner* — Masud Ahmed
(74) *Attorney, Agent, or Firm* — HAUPTMAN HAM, LLP

(57) ABSTRACT

Hybrid electric vehicle includes an engine, a first electric motor, a second electric motor, an electric power storage device, and a control device. The control device is configured to control the engine and the first electric motor so that the engine is operated at a first predetermined engine speed while outputting a predetermined torque, and to control the second electric motor so that a driving force based on a required driving force is output, when the rapid catalyst warm-up is executed when the engine is idle off.

11 Claims, 9 Drawing Sheets

(51) Int. Cl.
*B60W 20/40* (2016.01)
*F01N 3/20* (2006.01)
*B60K 6/24* (2007.10)
*B60K 6/26* (2007.10)

(52) U.S. Cl.
CPC ...... *B60K 6/24* (2013.01); *B60K 6/26* (2013.01); *B60Y 2200/92* (2013.01)

(58) Field of Classification Search
CPC .......... F02D 41/401; F02D 2041/1409; F02D 2250/18; F02P 5/045; F02P 5/1504
See application file for complete search history.

(56) References Cited

U.S. PATENT DOCUMENTS

| | | | |
|---|---|---|---|
| 6,510,834 B1 * | 1/2003 | Tomita | .................... F02D 41/06 |
| | | | 123/406.47 |
| 2005/0081511 A1 * | 4/2005 | Tomita | ................ F02D 41/3029 |
| | | | 60/285 |
| 2005/0086930 A1 * | 4/2005 | Akagi | ................. F02D 41/3076 |
| | | | 60/287 |

FOREIGN PATENT DOCUMENTS

| JP | 2013-067297 A | 4/2013 |
|---|---|---|
| JP | 2021175889 A | 11/2021 |
| JP | 2022137545 A | 9/2022 |

\* cited by examiner

FIG. 12

| STATE | SPARK F/B | ATTENUATION |
|---|---|---|
| TEMPORARY INTERRUPTION | MODE 0 | Tatt=Tat0 |
| NORMAL | MODE 1 | Tatt=Tat1 |
| ON ↔ OFF | MODE 2 | Tatt=0 |
| COMBUSTION DETERIORATION (1) | MODE 3 | Tatt=0 |
| COMBUSTION DETERIORATION (2) | MODE 4 | Tatt=Tat4 |

HYBRID ELECTRIC VEHICLE

CROSS-REFERENCE TO RELATED APPLICATION

This application claims priority to Japanese Patent Application No. 2022-074860 filed on Apr. 28, 2022, incorporated herein by reference in its entirety.

BACKGROUND

1. Technical Field

The present disclosure relates to a hybrid electric vehicle, and more particularly, to a hybrid electric vehicle including a first electric motor that is mechanically connected to an output shaft of an engine in which an exhaust gas control device is attached to an exhaust system and that is capable of generating electricity, and a second electric motor capable of inputting and outputting power for traveling.

2. Description of Related Art

In the related art, as a technique of this type, there has been proposed an engine device that performs rapid catalyst warm-up for warming up a catalyst of an exhaust gas control device attached to an exhaust system of an engine by performing a fuel injection in a compression stroke or an expansion stroke and a large retardation of an ignition timing when a condition such as a condition that the accelerator is off is satisfied at a catalyst temperature less than an activation temperature (for example, refer to Japanese Unexamined Patent Application Publication No. 2021-175889 (JP 2021-175889 A). In the engine device above, when the rapid catalyst warm-up is being performed, feedback control of the ignition timing is executed based on the engine speed.

SUMMARY

The rapid catalyst warm-up is usually performed when the idling operation of the engine is instructed (idle-on). However, when the idling operation of the engine is not instructed (idle-off), the rapid catalyst warm-up cannot be performed because the engine is generally operated under load. The hybrid electric vehicle including the first electric motor that is mechanically connected to the output shaft of the engine in which the exhaust gas control device is attached to the exhaust system and that is capable of generating electricity and the second electric motor capable of inputting and outputting power for traveling can travel using the second electric motor. Therefore, it is desired to perform the rapid catalyst warm-up even during the idle-off, but rapid catalyst warm-up control during the idle-on cannot be used as it is because control of the engine and the first electric motor during the idle-on differs from control of the engine and the first electric motor during the idle-off.

A main object of the hybrid electric vehicle according to the present disclosure is to execute more appropriate rapid catalyst warm-up control during the idle-off.

The hybrid electric vehicle according to the present disclosure adopts the following means in order to achieve the main object described above.

A hybrid electric vehicle according to a first aspect of the present disclosure is a hybrid electric vehicle that includes: an engine including an exhaust gas control device provided with a catalyst that controls exhaust gas and an in-cylinder injection valve, the exhaust gas control being attached to an exhaust system; a first electric motor that is mechanically connected to an output shaft of the engine and that is able to generate electricity; a second electric motor that is able to input and output power for traveling; an electric power storage device that is able to exchange electric power with the first electric motor and the second electric motor; and a control device that controls the engine, the first electric motor, and the second electric motor. The control device is configured to, when rapid catalyst warm-up in which fuel is injected in a compression stroke or an expansion stroke in the engine and the engine is operated with an ignition timing being retarded so as to warm up a catalyst of the exhaust gas control device during idle-off in which an idling operation of the engine is not instructed, control the engine and the first electric motor such that the engine is operated at a first predetermined engine speed while the engine outputs predetermined torque, and control the second electric motor such that a driving force based on a required driving force is output.

According to such a configuration, when the rapid catalyst warm-up in which fuel is injected in the compression stroke or the expansion stroke in the engine and the engine is operated with the ignition timing being retarded so as to warm up the catalyst of the exhaust gas control device during the idle-off in which the idling operation of the engine is not instructed, the control unit controls the engine and the first electric motor such that the engine is operated at the first predetermined engine speed while the engine outputs the predetermined torque, and controls the second electric motor such that the driving force based on the required driving force is output. This makes it possible to execute more appropriate rapid catalyst warm-up control during the idle-off. In order to operate the engine such that the engine becomes to have the first predetermined engine speed while the engine outputs the predetermined torque, it is sufficient to control the speed of the first electric motor such that the engine speed becomes the first predetermined engine speed, and to control an air amount such that the predetermined torque is output from the engine.

In the hybrid electric vehicle according to the first aspect, the control device may execute first feedback control that uses a proportional term and an integral term with respect to an air amount and/or an ignition timing of the engine using estimated engine torque estimated based on output torque of the first electric motor when the rapid catalyst warm-up is performed during the idle-off. The torque output from the engine when the first electric motor is controlled such that the engine becomes to have the first predetermined engine speed can be estimated by the torque output from the first electric motor. Therefore, it is possible to execute the feedback control on the air amount and the ignition timing of the engine such that the estimated engine torque becomes desired torque using the estimated engine torque estimated based on the output torque of the first electric motor. Execution of the first feedback control described above makes it possible to perform the rapid catalyst warm-up as a relatively stable operation state of the engine.

In the hybrid electric vehicle according to the first aspect, the control device may execute the first feedback control such that the estimated engine torque becomes equal to or more than reference torque that is smaller than the predetermined torque when the estimated engine torque becomes less than the reference torque. According to such a configuration, the first feedback control is executed only when the estimated engine torque becomes less than the reference torque. Therefore, it is possible to avoid excessive execution of the control and to reduce the load on the control device. Further, it is possible to continue the engine control in which the exhaust gas reduction is prioritized while the optimum balance between the amount of exhaust gas from the engine and the energy supplied to the catalyst is not disrupted.

In the hybrid electric vehicle according to the first aspect, when the rapid catalyst warm-up is performed during idle-on in which the idling operation of the engine is instructed, the control device may control the engine and the first electric motor such that the engine autonomously operates at a second predetermined engine speed and control the second electric motor such that the driving force based on the required driving force is output, and execute second feedback control that uses the proportional term and the integral term with respect to the air amount and/or the ignition timing of the engine using an engine speed of the engine. According to such a configuration, it is possible to perform the rapid catalyst warm-up as a relatively stable operation state of the engine even during the idle-on.

In the hybrid electric vehicle according to the first aspect, the control device may attenuate an integral term in the first feedback control when the idle-off is switched to the idle-on while the rapid catalyst warm-up is being performed, and attenuate an integral term in the second feedback control when the idle-on is switched to the idle-off while the rapid catalyst warm-up is being performed.

In the hybrid electric vehicle according to the first aspect, the control device may attenuate an integral term of feedback control with respect to the air amount based on an intake air amount at a current time, and attenuate an integral term of feedback control with respect to the ignition timing based on a mode predetermined for a plurality of states.

In the hybrid electric vehicle according to the first aspect, the control device may prohibit the first feedback control when an engine speed is increased by the first electric motor. The above is based on that the first feedback control should not be executed because the output torque of the first electric motor in this case does not reflect the torque output from the engine.

In the hybrid electric vehicle according to the first aspect, the control device may retain an integral term of feedback control with respect to the ignition timing for a predetermined time when the idle-off is switched to the idle-on and the idle-on is switched to the idle-off while the rapid catalyst warm-up is being performed.
According to such a configuration, it is possible to suppress a sudden change in the ignition timing.

In the hybrid electric vehicle according to the first aspect, in a case where the ignition timing is corrected in a direction different from an ignition timing base value after feedback control is switched accompanied by that the idle-off is switched to the idle-on and the idle-on is switched to the idle-off while the rapid catalyst warm-up is being executed, the control device may correct an integral term of the feedback control after the feedback control is switched such that the ignition timing is corrected in a direction of the ignition timing base value. According to such a configuration, it is possible to suppress the ignition timing from being corrected in a direction different from the ignition timing base value after switching.

In the hybrid electric vehicle according to the first aspect, when feedback control is switched accompanied by that the idle-off is switched to the idle-on and the idle-on is switched to the idle-off while the rapid catalyst warm-up is being performed, the control device may gradually change the ignition timing to an ignition timing base value after the feedback control is switched. According to such a configuration, it is possible to suppress a sudden change in the ignition timing.

In the hybrid electric vehicle according to the first aspect, when the feedback control is switched accompanied by that the idle-off is switched to the idle-on and the idle-on is switched to the idle-off while the rapid catalyst warm-up is being performed, the control device may gradually change an upper and lower limit guard value to an upper and lower limit guard value after the feedback control is switched. According to such a configuration, it is possible to avoid a case where the ignition timing suddenly changes due to the upper and lower limit guard value after switching, even though the ignition timing gradually changes toward the ignition timing base value after switching.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flow chart illustrating an exemplary rapid catalyst warm-up control performed by an engine ECU 24, a HVECU 70, or the like;

FIG. 4 is a flowchart of an example of a feedback control process for idle-on;

FIG. 12 is an explanatory diagram illustrating a list of exemplary modes of the ignition timing feedback control and attenuation Tatt.

DETAILED DESCRIPTION OF EMBODIMENTS

Next, modes for carrying out the disclosure will be described using an embodiment.

EXAMPLES

Figure 1:
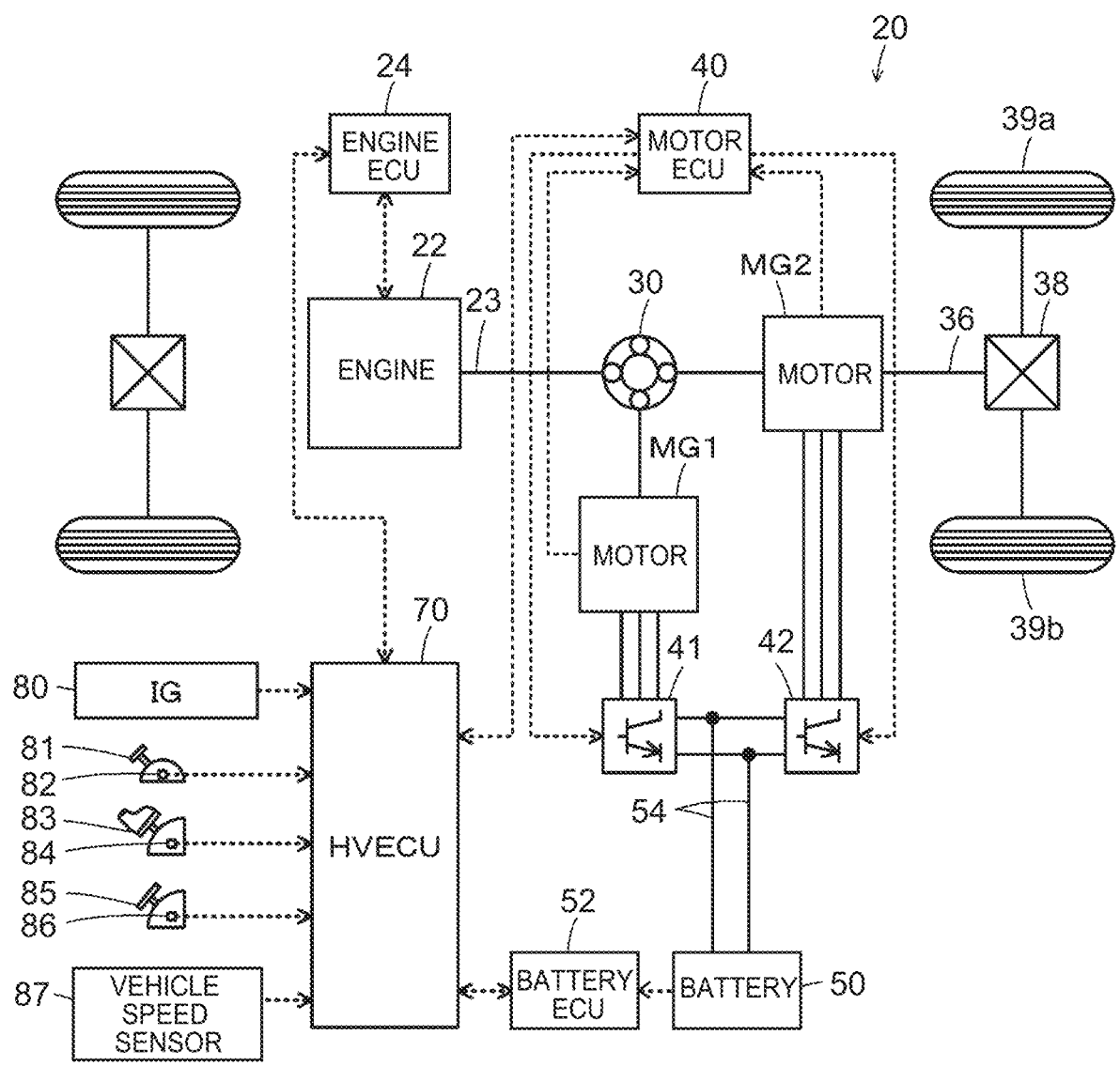
FIG. 1 is a configuration diagram schematically showing a configuration of a hybrid electric vehicle 20 according to an embodiment of the present disclosure.
Figure 2:
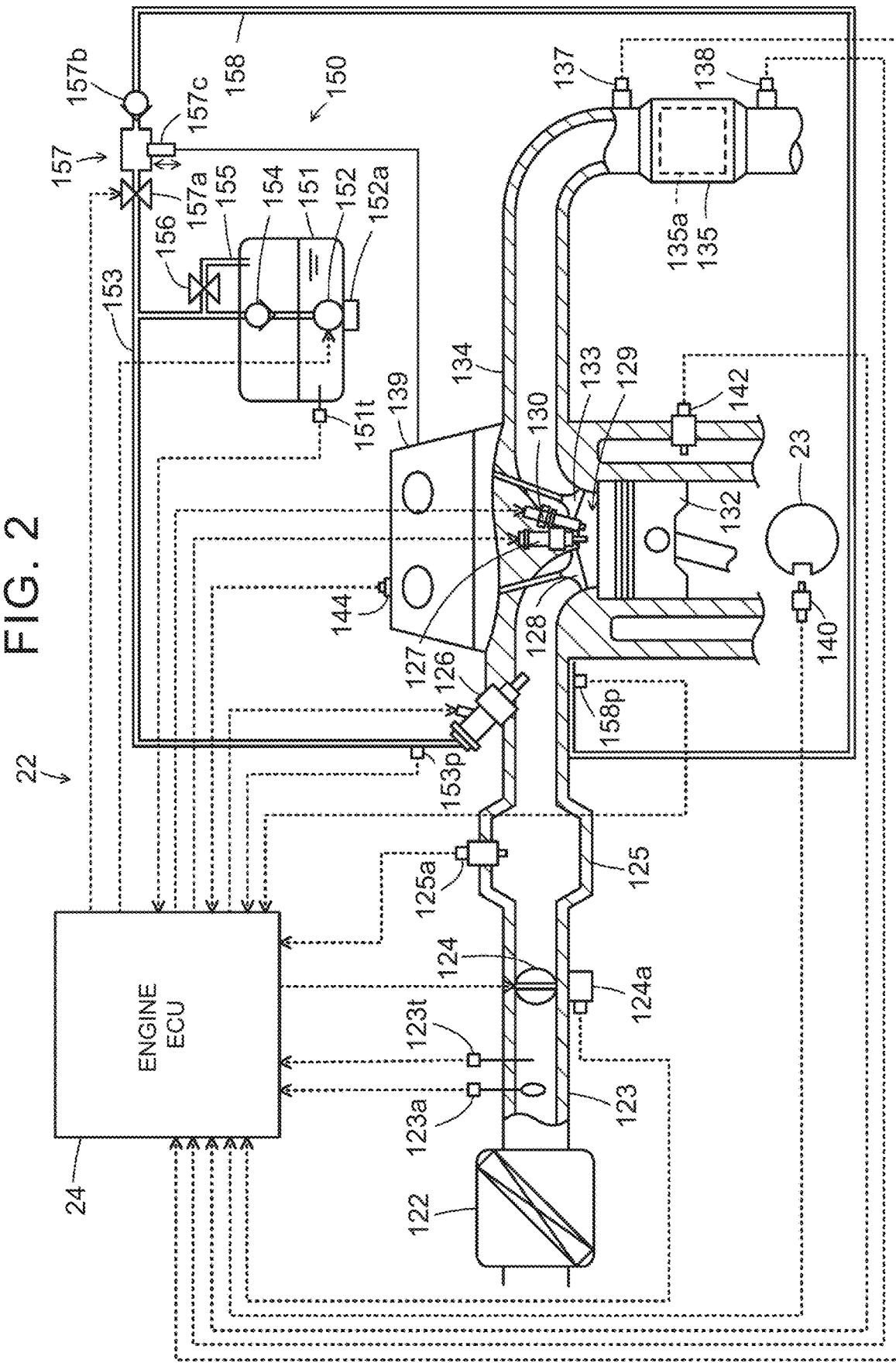
FIG. 2 is a configuration diagram illustrating an outline of a configuration of the engine 22.

FIG. 1 is a configuration diagram schematically showing a configuration of a hybrid electric vehicle 20 according to an embodiment of the present disclosure, and FIG. 2 is a configuration diagram schematically showing a configuration of an engine 22. As shown in FIG. 1, hybrid electric vehicle 20 includes an engine 22, a planetary gear 30, a motor MG 1,MG 2, inverters 41 and 42, a battery 50, and a hybrid electronic control unit (hereinafter referred to as a HVECU) 70.

The engine 22 is configured as a six-cylinder internal combustion engine that uses fuel such as gasoline or diesel oil to output power by four strokes of intake, compression, expansion (combustion), and exhaust. As illustrated in FIG. 2, the engine 22 includes a port injection valve 126 that injects fuel supplied from the fuel supply device 150 to the intake port via the low-pressure supply pipe 153, and an in-cylinder injection valve 127 that injects fuel supplied from the fuel supply device 150 into the cylinder via the high-pressure supply pipe 158. The in-cylinder injection valve 127 is disposed substantially in the center of the top portion of the combustion chamber 129, and injects fuel in a spray shape. The spark plug 130 is disposed in the vicinity of the in-cylinder injection valve 127 so as to be able to ignite the fuel sprayed from the in-cylinder injection valve 127 in a spray shape. The engine 22 has the port injection valve 126 and the in-cylinder injection valve 127, so that the engine 22 can be operated in either a port injection mode, an in-cylinder injection mode, or a common injection mode. In the port injection mode, air cleaned by an air cleaner 122 is taken into an intake pipe 123 to pass through a throttle valve 124 and a surge tank 125, and fuel is injected from the port injection valve 126 downstream of the surge tank 125 of the intake pipe 123 to mix air and fuel. Then, the air-fuel mixture is taken into a combustion chamber 129 through an intake valve 128, and is combusted by an electric spark by a spark plug 130 to convert the reciprocating motion of a piston 132 pushed down by the energy in the cylinder bore into the rotational motion of a crankshaft 23. In the in-cylinder injection mode, as in the port injection mode, air is taken into the combustion chamber 129, fuel is injected from the in-cylinder injection valve 127 in the intake stroke and the compression stroke, and the air-fuel mixture is combusted by an electric spark by the spark plug 130 to obtain a rotational motion of the crankshaft 23. In the common injection mode, when air is taken into the combustion chamber 129, fuel is injected from the port injection valve 126, and also fuel is injected from the in-cylinder injection valve 127 in the intake stroke or the compression stroke, whereby the air-fuel mixture is combusted by an electric spark by the spark plug 130 to obtain a rotational motion of the crankshaft 23. These injection modes are switched based on the operating state of the engine 22. The exhaust gas discharged from the combustion chamber 129 to the exhaust pipe 134 via the exhaust valve 133 is discharged to the outside air via the exhaust gas control device 135. The exhaust gas control device 135 has an exhaust reduction catalyst (three-way catalyst) 135a for reducing harmful components of carbon monoxide (CO), hydrocarbons (HC), and nitrogen oxides (NOx) in the exhaust gas.

The fuel supply device 150 is configured as a device that supplies the fuel in the fuel tank 151 to the port injection valve 126 and the in-cylinder injection valve 127 of the engine 22. The fuel supply device 150 includes a fuel tank 151, a feed pump 152, a low-pressure supply pipe 153, a check valve 154, a relief pipe 155, a relief valve 156, a high-pressure pump 157, and a high-pressure supply pipe 158.

The feed pump 152 is configured as an electric pump operated by receiving electric power from a battery (not shown), and is disposed in the fuel tank 151. The feed pump 152 supplies the fuel in the fuel tank 151 to the low-pressure supply pipe 153. The low-pressure supply pipe 153 is connected to the port injection valve 126. The check valve 154 is provided in the low-pressure supply pipe 153, and allows the flow of fuel in the direction from the feed pump 152 side to the port injection valve 126 side, and also restricts the flow of fuel in the reverse direction.

The relief pipe 155 is connected to the low-pressure supply pipe 153 and the fuel tank 151. The relief valve 156 is provided in the relief pipe 155, and closes when the fuel pressure in the low-pressure supply pipe 153 is less than the threshold Pflolim, and opens when the fuel pressure in the low-pressure supply pipe 153 is equal to or greater than the threshold Pflolim. When the relief valve 156 is opened, a portion of the fuel in the low-pressure supply pipe 153 is returned to the fuel tank 151 via the relief pipe 155. In this way, excessive fuel pressure in the low-pressure supply pipe 153 is suppressed.

The high-pressure pump 157 is configured as a pump that is driven by power from the engine 22 (in the embodiment, rotation of an intake camshaft that opens and closes the intake valve 128) and pressurizes the fuel in the low-pressure supply pipe 153 to be supplied to the high-pressure supply pipe 158. The high-pressure pump 157 has a solenoid valve 157a which is connected to the suction port and opens and closes when pressurizing the fuel, a check valve 157b which is connected to the discharge port and regulates the reverse flow of the fuel and holds the fuel pressure in the high-pressure supply pipe 158, and a plunger 157c which is operated (vertically moved in FIG. 1) by the rotation of the engine 22 (rotation of the intake camshaft). During operation of the engine 22, the high-pressure pump 157 sucks the fuel in the low-pressure supply pipe 153 when the solenoid valve 157a is opened, and intermittently feeds the fuel compressed by the plunger 157c to the high-pressure supply pipe 158 through the check valve 157b when the solenoid valve 157a is closed, thereby pressurizing the fuel supplied to the high-pressure supply pipe 158.

The operation of the engine 22 is controlled by an engine ECU 24. Although not shown, the engine ECU 24 includes a microcomputer having a CPU, a ROM, RAM, a flash memory, an input/output port, and a communication port.

The engine ECU 24 receives signals from various sensors required for controlling the operation of the engine 22 via input ports. Examples of the signal inputted to the engine ECU 24 include the crank angle θcr from the crank position sensor 140 that detects the rotational position of the crankshaft 23 of the engine 22 and the coolant temperature Tw from the water temperature sensor 142 that detects the temperature of the coolant of the engine 22. Examples of the signals input to the engine ECU 24 may also include cam angles θci, θco from a cam position sensor 144 for detecting the rotational position of an intake camshaft that opens and closes the intake valve 128 and the rotational position of an exhaust camshaft that opens and closes the exhaust valve 133. Examples of the signals input to the engine ECU 24 may also include a throttle valve degree TH from a throttle valve position sensor 124a for detecting the position of the throttle valve 124, an intake air amount Qa from an air flow meter 123a mounted upstream of the throttle valve 124 of the intake pipe 123, an intake air temperature Ta from a temperature sensor 123t mounted upstream of the throttle valve 124 of the intake pipe 123, and a surge pressure Ps from a pressure sensor 125a mounted on the surge tank 125. The front air-fuel ratio AF1 from the front air-fuel ratio sensor 137 mounted upstream of the exhaust gas control device 135 in the exhaust pipe 134 and the rear air-fuel ratio AF2 from the rear air-fuel ratio sensor 138 mounted between the exhaust gas control device 135 and PM filters 136 in the exhaust pipe 134 can also be cited. The fuel temperature Tftnk from the fuel temperature sensor 151*t* attached to the fuel tank 151, the rotational speed Np of the feed pump 152 from the rotational speed sensor 152*a* attached to the feed pump 152, the low-pressure fuel pressure (the pressure of the fuel supplied to the port injection valve 126) PL from the fuel pressure sensor 153*p* attached to the vicinity of the port injection valve 126 of the low-pressure supply pipe 153 (for example, the low-pressure delivery pipe), and the high-pressure fuel pressure (the pressure of the fuel supplied to the in-cylinder injection valve 127) from the fuel pressure sensor 158*p* attached to the vicinity of the in-cylinder injection valve 127 of the high-pressure supply pipe 158 (for example, the high-pressure delivery pipe) can also be mentioned as PH.

Various control signals for controlling the operation of the engine 22 are output from the engine ECU 24 via output ports. Examples of the signal outputted from the engine ECU 24 include a control signal to the throttle valve 124, a control signal to the port injection valve 126, a control signal to the in-cylinder injection valve 127, a control signal to the spark plug 130, and a control signal to the variable valve timing mechanism 139 capable of changing the opening and closing timing of the intake valve 128. Control signals to the feed pump 152 of the fuel supply device 150 and control signals to the solenoid valve 157*a* of the high pressure pump 157 may also be mentioned.

The engine ECU 24 is connected to HVECU 70 via a communication port. The engine ECU 24 calculates the engine speed Ne of the engine 22 based on the crank angle θcr of the engine 22 from the crank position sensor 140. In addition, the engine ECU 24 calculates a load factor (ratio of the volume of air actually sucked in one cycle to the stroke volume per cycle of the engine 22) KL based on the intake air amount Qa from the air flow meter 123*a* and the engine speed Ne of the engine 22.

As shown in FIG. 1, the planetary gear 30 is configured as a single pinion type planetary gear mechanism. A rotor of the motor MG1 is connected to the sun gear of the planetary gear 30. A drive shaft 36 connected to a drive wheel 39*a*,39*b* via a differential gear 38 is connected to a ring gear of the planetary gear 30. A crankshaft 23 of the engine 22 is connected to a carrier of the planetary gear 30.

The motor MG1 is configured, for example, as a synchronous generator motor, and the rotor is connected to the sun gear of the planetary gear 30 as described above. The motor MG2 is configured as, for example, a synchronous generator motor, and the rotor is connected to the drive shaft 36. The inverters 41 and 42 are used to drive the motor MG1,MG2 and are connected to the battery 50 via a power line 54. The motor MG1,MG2 is rotationally driven by switching control of a plurality of switching elements (not shown) of the inverters 41 and 42 by a motor electronic control unit (hereinafter referred to as "motor ECU") 40.

Although not shown, the motor ECU 40 includes a microcomputer having a CPU, a ROM, RAM, a flash memory, an input/output port, and a communication port. To the motor ECU 40, signals from various sensors required to drive and control the motor MG1,MG2 are input via input ports. The motor ECU 40 includes, for example, rotational positions θm1 and θm2 from a rotational position sensor (not shown) that detects the rotational position of the rotor of the motor MG1,MG2, and phase current Iu1,Iv1,Iu2,Iv2 from a current sensor (not shown) that detects a phase current flowing in each phase of the motor MG1,MG2. The motor ECU 40 outputs switching control signals and the like to a plurality of switching elements (not shown) of the inverters 41 and 42 via output ports. The motor ECU 40 is connected to HVECU 70 via a communication port. The motor ECU 40 calculates the electric angles θe1 and θe2 and the rotational speed Nm1,Nm2 of the motor MG1,MG2 based on the rotational positions θm1 and θm2 of the rotor of the motor MG1,MG2 from the rotational position sensor.

The battery 50 is configured as, for example, a lithium-ion secondary battery or a nickel-hydrogen secondary battery, and is connected to the inverters 41 and 42 via the power line 54 as described above. The battery 50 is managed by a battery electronic control unit (hereinafter referred to as "battery ECU") 52.

Although not shown, the battery ECU 52 includes a microcomputer having a CPU, a ROM, RAM, a flash memory, an input/output port, and a communication port. In the battery ECU 52, signals from various sensors required to manage the battery 50 are input via input ports. Examples of the signal inputted to the battery ECU 52 include a voltage Vb of the battery 50 from a voltage sensor (not shown) attached between terminals of the battery 50, a current Ib of the battery 50 from a current sensor (not shown) attached to an output terminal of the battery 50, and a temperature Tb of the battery 50 from a temperature sensor (not shown) attached to the battery 50. The battery ECU 52 is connected to HVECU 70 via a communication port. The battery ECU 52 calculates the power storage ratio SOC of the battery 50 based on the integrated value of the current Ib of the battery 50 from the current sensor. The power storage ratio SOC is a ratio of the amount of electric power that can be discharged from the battery 50 to the total capacity of the battery 50.

Although not shown, HVECU 70 includes a microcomputer having a CPU, a ROM, RAM, a flash memory, an input/output port, and a communication port. Signals from various sensors are input to HVECU 70 through the input port. Examples of the signal inputted to HVECU 70 include an ignition signal from the ignition switch 80 and a shift position SP from the shift position sensor 82 that detects the operating position of the shift lever 81. Further, the accelerator operation amount Acc from the accelerator pedal position sensor 84 that detects the depression amount of the accelerator pedal 83, the brake pedal position BP from the brake pedal position sensor 86 that detects the depression amount of the brake pedal 85, and the vehicle speed V from the vehicle speed sensor 87 can also be exemplified. As described above, HVECU 70 is connected to the engine ECU 24, the motor ECU 40, and the battery ECU 52 via a communication port.

In hybrid electric vehicle 20 of the embodiment configured in this way, by the cooperative control of HVECU 70, the engine ECU 24, and the motor ECU 40, basically, the hybrid driving mode (HV driving mode) traveling with the operation of the engine 22 and the electric driving mode (EV driving mode) traveling without the operation of the engine 22 are switched, and the engine 22 is driven with intermittent operation.

In HV traveling mode, basically, HVECU 70 first sets the traveling torque Td* (required for the drive shaft 36) required for traveling based on the accelerator operation amount Acc and the vehicle speed V, multiplies the set traveling torque Td*, by the rotational speed Nd of the drive shaft 36 (the rotational speed Nm2 of the motor MG2), and calculates the traveling power Pd * required for traveling. Subsequently, the target power Pe* of the engine 22 is set based on the traveling power Pd* and the power storage ratio SOC of the battery 50, and the target engine speed Ne*, the target torque Te*, and the torque command Tm1*, Tm2* of the motor MG1,MG2 of the engine 22 are set so that the target power Pe* is output from the engine 22 and the traveling torque Td* is output to the drive shaft 36. The set target engine speed Ne* and target torque Te* are transmitted to the engine ECU 24, and the torque command Tm1*, Tm2* is transmitted to the motor ECU 40.

The engine ECU 24 performs operation control of the engine 22, for example, intake air amount control, fuel injection control, ignition control, and opening/closing timing control so that the engine 22 is operated based on the target engine speed Ne* and the target torque Te*. The intake air amount control is performed by controlling the opening degree of the throttle valve 124. The fuel injection control is performed by controlling the fuel injection amounts from the port injection valve 126 and the in-cylinder injection valve 127 in the port injection mode, the in-cylinder injection mode, and the shared injection mode. The ignition control is performed by controlling the ignition timing of the spark plug 130. The motor ECU 40 performs switching control of the plurality of switching elements of the inverters 41 and 42 so that the motor MG1,MG2 is driven by the torque command Tm1*, Tm2*.

In EV running mode, HVECU 70 transmits the set torque command Tm1*, Tm2 to the motor ECU 40 by setting the traveling torque Td * as in HV running mode, setting 0 to the torque command Tm1* of the motor MG1, and setting the torque command Tm2* of the motor MG2 so that the traveling torque Td * is outputted to the drive shaft 36. The control of the inverters 41 and 42 by the motor ECU 40 has been described above.

In HV running mode, it is determined that the stop condition of the engine 22 is satisfied, for example, when the target power Pe* reaches less than the power threshold Peref, and the engine 22 is stopped to switch to EV running mode. In EV traveling mode, the engine 22 is started to switch to HV traveling mode by determining that the starting condition of the engine 22 is satisfied, for example, when the target power Pe* calculated in the same manner as in HV traveling mode reaches the power threshold value (Peref+α) or more.

In hybrid electric vehicle 20 of the embodiment, catalyst warm-up is performed on the purification catalyst (three-way catalyst) 135a of the exhaust gas control device 135 attached to the exhaust pipe 134 of the engine 22. Catalyst warm-up of the exhaust gas control device 135 is performed when a condition equal to or lower than a predetermined temperature below the temperature at which the catalyst temperature Tc is activated and an accelerator-off condition are satisfied. Catalyst warm-up is usually catalyst warm-up and rapid catalyst warm-up. Normally, the catalyst warm-up is performed by maintaining the engine speed Ne of the engine 22 Nset a predetermined engine speed (for example, 1300 rpm or the like), performing fuel injection once to three times in an intake stroke from the in-cylinder injection valve 127, making the air-fuel mixture in the combustion chamber 129 homogeneous, and performing explosive combustion (homogeneous combustion) by retarding the ignition timing from the normal timing. Rapid catalyst warm-up is performed by maintaining the engine speed Ne of the engine 22 at a predetermined engine speed (for example, 1300 rpm or the like) Nset, and not only performing fuel injection from the in-cylinder injection valve 127 in the intake stroke, but also performing the final fuel injection in the compression stroke so that the ignition timing is further retarded from the normal catalyst warm-up and explosively burned (stratified combustion) while the fuel concentration of the air-fuel mixture in the vicinity of the spark plug 130 among the air-fuel mixture in the combustion chamber 129 is increased. When the ignition timing is retarded, the combustion efficiency is lowered, so that the engine speed Ne of the engine 22 is maintained by increasing the intake air amount, while the absolute amount of the emission components is also increased by increasing the amount of the combustion gases, but the catalyst warm-up is promoted. Therefore, the rapid catalyst warm-up can further promote the catalyst warm-up by further retarding the ignition timing as compared with the normal catalyst warm-up. In the rapid catalyst warm-up, fuel injection may be performed once to three times in an intake stroke or a compression stroke, and the final fuel injection may be performed in an expansion stroke and ignited in synchronization with the fuel injection in the expansion stroke to perform explosive combustion (stratified combustion).

Figure 3:
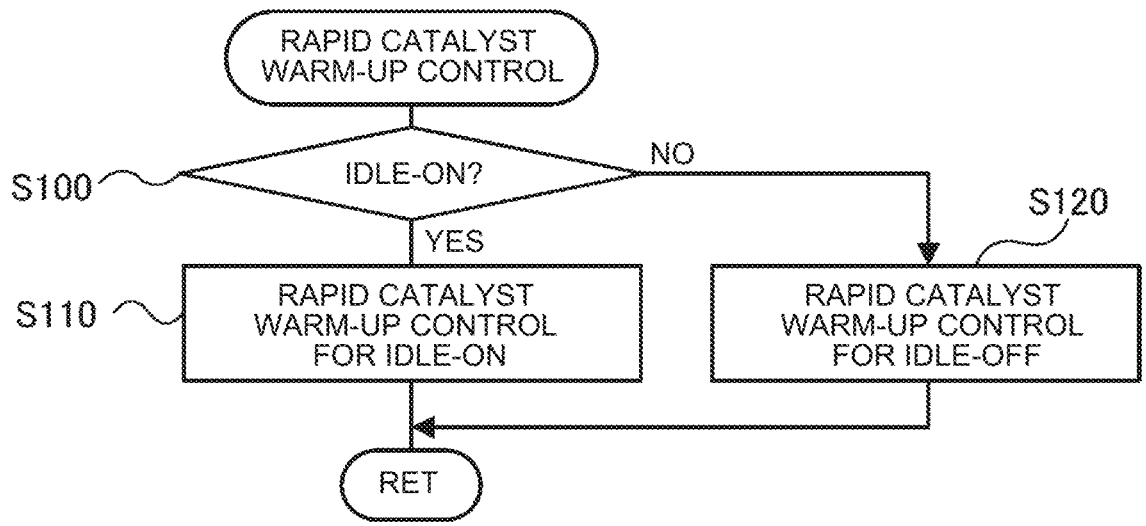

Next, the operation of hybrid electric vehicle 20 of the embodiment configured in this way, in particular, the operation when the rapid catalyst warm-up control is executed, will be described. FIG. 3 is a flow chart illustrating an exemplary rapid catalyst warm-up control performed by ECU 24 and HVECU 70.

When the rapid catalyst warm-up control is executed, first, it is determined whether or not the idle operation of the engine 22 is instructed (whether the engine is idle-on or idle-off) (step S100). When it is determined that the vehicle is idle-on, rapid catalyst warm-up control for idle-on is executed (step S110), and when it is determined that the vehicle is idle-off, rapid catalyst warm-up control for idle-off is executed (step S120), and this process is terminated.

Figure 4:
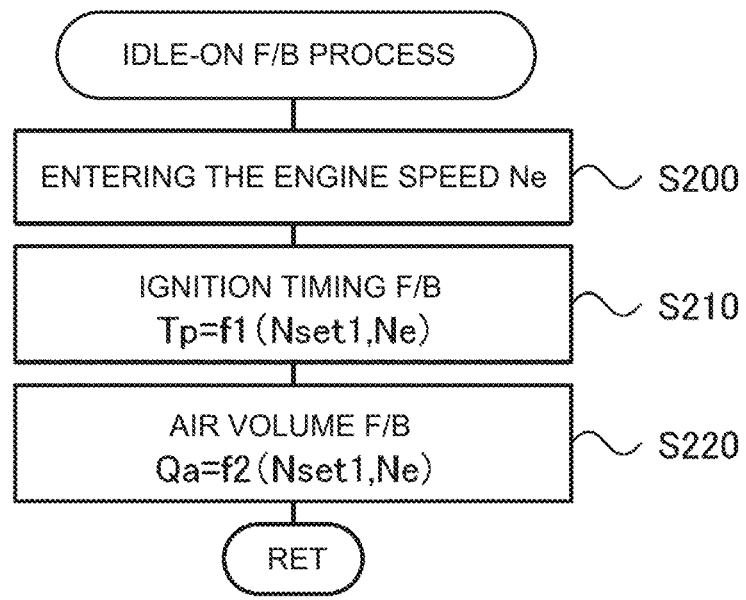

As the rapid catalyst warm-up control for idle-on, the engine 22 is controlled so as to autonomously operate so that the engine speed Ne of the engine 22 becomes a predetermined engine speed Nset, and is performed by injecting fuel from the in-cylinder injection valve 127 in a plurality of times in an intake stroke, a compression stroke, or an expansion stroke, and causing the ignition timing Tp to be explosively burned (stratified combustion) by being further retarded from the normal catalyst warm-up. At this time, the autonomous operation of the engine 22 is controlled by executing feedback control of the ignition timing Tp and the air amount (intake air amount) Qa with respect to the engine speed Ne of the engine 22. FIG. 4 is a flowchart of an example of feedback control processing for idle-on.

In the feedback control process for idle-on, first. The engine speed Ne of the engine 22 is inputted (step S200), the ignition timing Tp is controlled by the relational expression in the feedback control of the ignition timing Tp shown in the following equation (1) (step S210), and the air amount Qa is controlled by the relational expression in the feedback control of the air amount Qa shown in the following equation (2) (step S220), and the process is ended. In Equation (1), "Tbase1" is the ignition timing base value in the rapid catalyst warm-up control for idle-on, "k11" is the constant of the proportional term, and "k12" is the constant of the integral term. The ignition timing base value Tbase1 in the rapid catalyst warm-up control for idle-on is a base value that is further retarded than the ignition timing in the normal catalyst warm-up control. In Equation (2), "Qbase1" is the air-volume-based value in the rapid catalyst warm-up control for idle-on, "k13" is the constant of the proportional term, and "k14" is the constant of the integral term. The air amount base value Qbase1 is an air amount required to autonomously operate the engine 22 with the ignition timing Tp as the ignition timing base value Tbase1 at a predetermined engine speed Nset, and can be obtained by experimentation, machine learning, or the like. When the air amount Qa is obtained, the throttle opening degree TH is adjusted so that the intake air amount becomes the air amount Qa.

[Equation 1]

$$Tp = T\text{base}1 + k11(N\text{set} - Ne) + k12\int(N\text{set} - Ne)dt \quad (1)$$

$$Qa = Q\text{base}1 + k13(N\text{set} - Ne) + k14\int(N\text{set} - Ne)dt \quad (2)$$

Figure 5:
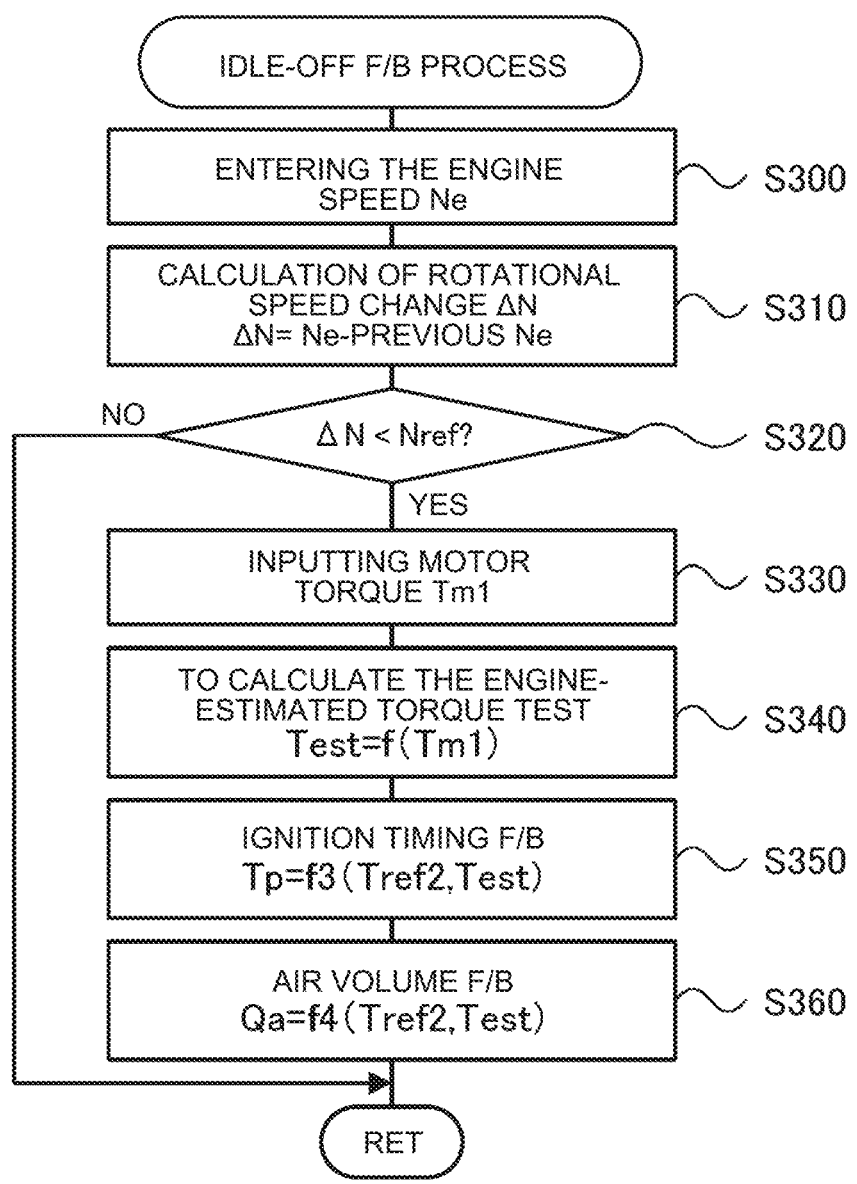
FIG. 5 is a flowchart of an example of a feedback control process for idle-off.
Figure 6:
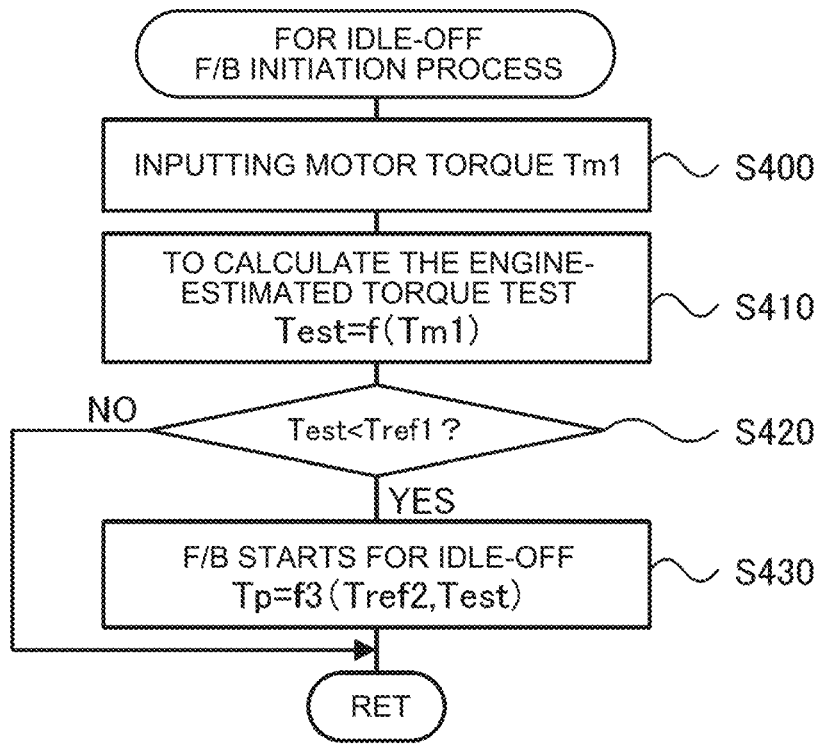
FIG. 6 is a flowchart of an example of a start process of feedback control for idle-off.

The rapid catalyst warm-up control for idle-off is performed by controlling the engine 22 and the motor MG1 so that the engine speed Ne of the engine 22 becomes a predetermined engine speed Nset and a predetermined torque (e.g., 20 Nm or 30 Nm) Tset is outputted from the engine 22, and by injecting fuel from the in-cylinder injection valve 127 in a plurality of times in an intake stroke, a compression stroke, or an expansion stroke, thereby further retarding the ignition timing Tp from the normal catalyst warm-up and causing explosive combustion (stratified combustion). At this time, since the power of the predetermined engine speed Nset×predetermined torque Tset is to be output from the engine 22, this power (Nset×Tset) is used as the target power Pe * to be output from the engine 22 in the drive control of HV running mode described above is output from the engine 22 power (Nset×Tset), the motor MG1 torque command Tm1*, the torque command Tm2* of the motor MG2 is calculated so that the value calculated by the following equation (3) is set and the traveling torque Td * is output to the drive shaft 36 by controlling the engine 22 and the motors MG1, MG2, it is possible to run by outputting the traveling torque Td* while rapid catalyst warm-up control for idle-off is being executed. Here, in Expression (3), "ρ" is the gear ratio of the planetary gear 30 (the number of teeth of the sun gear/the number of teeth of the ring gear). Note that the torque command Tm1* of the motor MG1 is not determined by the above-described Expression (3) because the feedback control is executed so that the engine 22 is operated at the predetermined engine speed Nset. In addition, in the rapid catalyst warm-up control for idle-off, as the control of the engine 22, feedback control is performed on the ignition timing Tp and the air amount (intake air amount) Qa with respect to the estimated torque Test output from the engine 22, which is calculated based on the torque Tm1 output from the motor MG1. FIG. 5 is a flowchart of an example of a feedback control process for idle-off, and FIG. 6 is a flowchart of an example of a start process of feedback control for idle-off. For ease of explanation, the feedback control processing for idle-off will be described after the start processing of the feedback control for idle-off is described.

[Equation 2]

$$Tm1 = -T\text{set} \times \frac{\rho}{1 + \rho} \quad (3)$$

When the process of starting the feedback control for idle-off is executed, first, the torque Tm1 of the motor MG1 is inputted (step S400). As the torque Tm1 of the motor MG1, for example, the torque command Tm1* of the motor MG1 set by HVECU 70 can be used. Subsequently, the estimated torque Test estimated to be outputted from the engine 22 based on the torque Tm1 of the motor MG1 is calculated (step S410). The estimated torques Test can be obtained by the following equation (4). In Expression (4), "ρ" is the gear ratio of the planetary gear 30 (the number of teeth of the sun gear/the number of teeth of the ring gear).

[Mathematical formula 3]

$$T\text{est} = -Tm1 \times \frac{1 + \rho}{\rho} \quad (4)$$

Subsequently, it is determined whether or not the estimated torque Test is less than the threshold Tref1 (step S420). The threshold Tref1 is set as the output torque of the engine 22 to be maintained in the rapid catalyst warm-up in the idle-off state, and may be, for example, a predetermined torque Tset or may be smaller than a predetermined torque Tset, and may be, for example, a 10 Nm, a 5 Nm, 0 Nm, or the like. That is, a torque capable of rapid catalyst warm-up is sufficient. When it is determined that the estimated torque Test is equal to or larger than the threshold Tref1, it is determined that the rapid catalyst warm-up can be performed, and the process ends. On the other hand, when it is determined that the estimated torque Test is less than the threshold Tref1, it is determined that the feedback control for idle-off is required, and the feedback control for idle-off is started (step S430), and this process is ended.

When the feedback control for idle-off is started, the feedback control processing for idle-off shown in FIG. 5 is repeatedly executed. When the feedback control process for idle-off is executed, first, the engine speed Ne of the engine 22 is inputted (step S300). Subsequently, the rotational speed change amount ΔN (ΔN=Ne previous Ne−) is calculated by subtracting the engine speed Ne (hereinafter, referred to as the previous engine speed Ne) input when the previous process is executed from the input engine speed Ne (step S310), it is determined whether or not the rotational speed change amount ΔN is less than the threshold Nref (step S320). The threshold Nref is a threshold for determining whether or not the engine speed Ne of the engine 22 is increased by the motor MG1, and is determined by the repetition frequency of the idle-off feedback control process. When it is determined that the rotational speed change amount ΔN is equal to or larger than the threshold Nref, since the rotational speed Ne of the engine 22 is increased by the motor MG1, it is determined that the estimated torque Test outputted from the engine 22 should not be estimated based on the torque Tm1 of the motor MG1, and this process is ended.

On the other hand, when it is determined in step S320 that the rotational speed change amount ΔN is less than the threshold Nref, the torque Tm1 of the motor MG1 is inputted (step S330), the estimated torque Test estimated to be outputted from the engine 22 by the above-described equation (4) is calculated (step S340), the ignition timing Tp is controlled by the relational expression in the feedback control of the ignition timing Tp shown in the following equation (5) using the estimated torque Test (step S350), and the air amount Qa1 is controlled by the relational expression in the feedback control of the air amount Qa shown in the following equation (6) (step S360), and the process is ended. In Equation (5), "Tbase2" is the ignition timing base value in the rapid catalyst warm-up control for idle-off, "k21" is the constant of the proportional term, and "k22" is the constant of the integral term. The ignition timing base value Tbase2 in the rapid catalyst warm-up control for idle-off is a value retarded from the ignition timing base value Tbase1 in the rapid catalyst warm-up control for idle-on, but the same value may be used. In Equation (6), "Qbase2" is an air amount-based value in rapid catalyst warm-up control for idle-off, "k23" is a constant of a proportional term, and "k24" is a constant of an integral term. The air amount base value Qbase1 is an air amount required for outputting a predetermined torque Tset from the engine 22 using the ignition timing Tp as the ignition timing base value Tbase2 at a predetermined engine speed Nset for the engine 22, and can be obtained by experimentation, machine learning, or the like. The "Tref2" in the equations (5) and (6) is a torque (hereinafter referred to as a convergence torque Tref2) that should converge the estimated torque Test, and a value that is greater than or equal to a threshold Tref1 and less than or equal to a predetermined torque Tset is used. Therefore, in the idle-off state, the feedback control is started when the estimated torque Test reaches less than the threshold Tref1, and the estimated torque Test is controlled to be the converging torque Tref2. At this time, when the convergence torque Tref2 is the same as the threshold Tref1, the feedback control is started when the estimated torque Test reaches less than the threshold Tref1, and the control is performed so that the estimated torque Test becomes the threshold Tref1 (convergence torque Tref2).

[Mathematical Formula 4]

$$Tp = Tbase2 + k21(Tref2 - Test) + k22 \int (Tref2 - Test) dt \quad (5)$$

$$Qa = Qbase2 + k23(Tref2 - Test) + k24 \int (Tref2 - Test) dt \quad (6)$$

Figure 7:
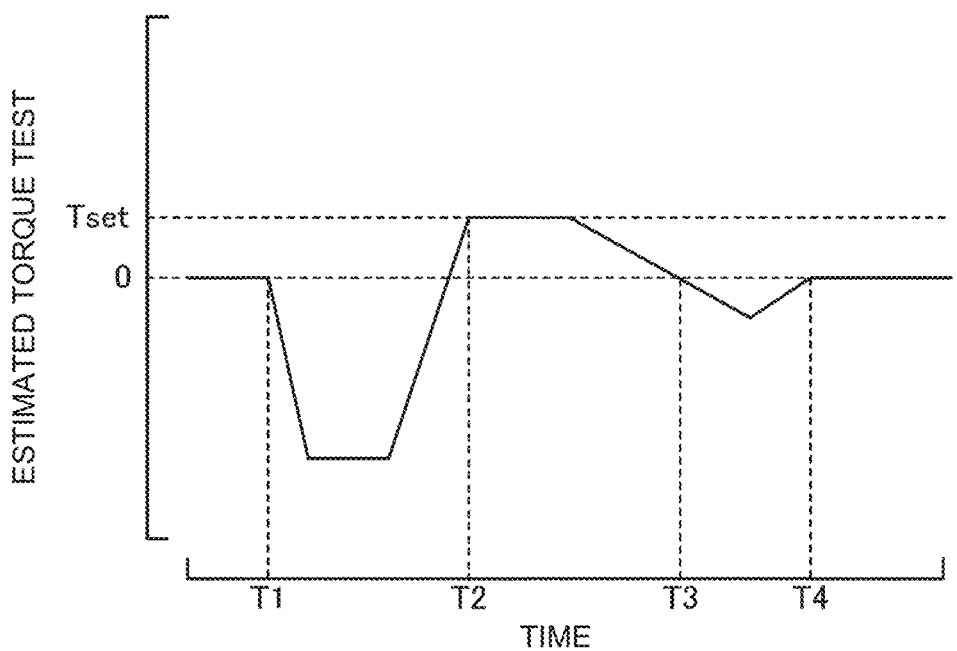
FIG. 7 is an explanatory diagram illustrating an exemplary temporal change in the estimated torque Test when 0 is used as the threshold Tref1 and the convergent torque Tref2 in the feedback control in the rapid catalyst warm-up control for idle-off.

FIG. 7 is an explanatory diagram illustrating an exemplary temporal change in the estimated torque Test when 0 is used for both the threshold Tref1 and the convergent torque Tref2 in the feedback control in the rapid catalyst warm-up control for idle-off. The cranking torque is output from the motor MG1 in the time T1, the engine 22 is started, the predetermined torque Tset is output from the engine 22 with the engine speed Ne of the engine 22 at a predetermined engine speed Nset in the time T2, and the rapid catalyst warm-up control in the idle-off state is started. Thereafter, the feedback control in the rapid catalyst warm-up control in the idle-off state is started in the time T3 the estimated torque Test reaches less than the threshold Tref1 (value 0), and the estimated torque Test converges to the converged torque Tref2 (value 0) in the time T4.

As described above, in hybrid electric vehicle 20 of the embodiment, the rapid catalyst warm-up control for idle-on is executed at the time of idle-on, and the rapid catalyst warm-up control for idle-on is executed at the time of idle-off, which differs from the rapid catalyst warm-up control for idle-on. As a result, it is possible to execute more appropriate rapid catalyst warm-up control at the time of idle-off.

In hybrid electric vehicle 20 of the embodiment, when the rapid catalyst warm-up control for idle-off is executed, the feedback control in the rapid catalyst warm-up control at idle-off is started when the estimated torque Test reaches less than the threshold Tref1. However, the feedback control may be started at the same time as the rapid catalyst warm-up control for idle-off is started or after a predetermined time has elapsed. The converging torque Tref2 is preferably the same as the predetermined torque Tset.

Figure 8A:
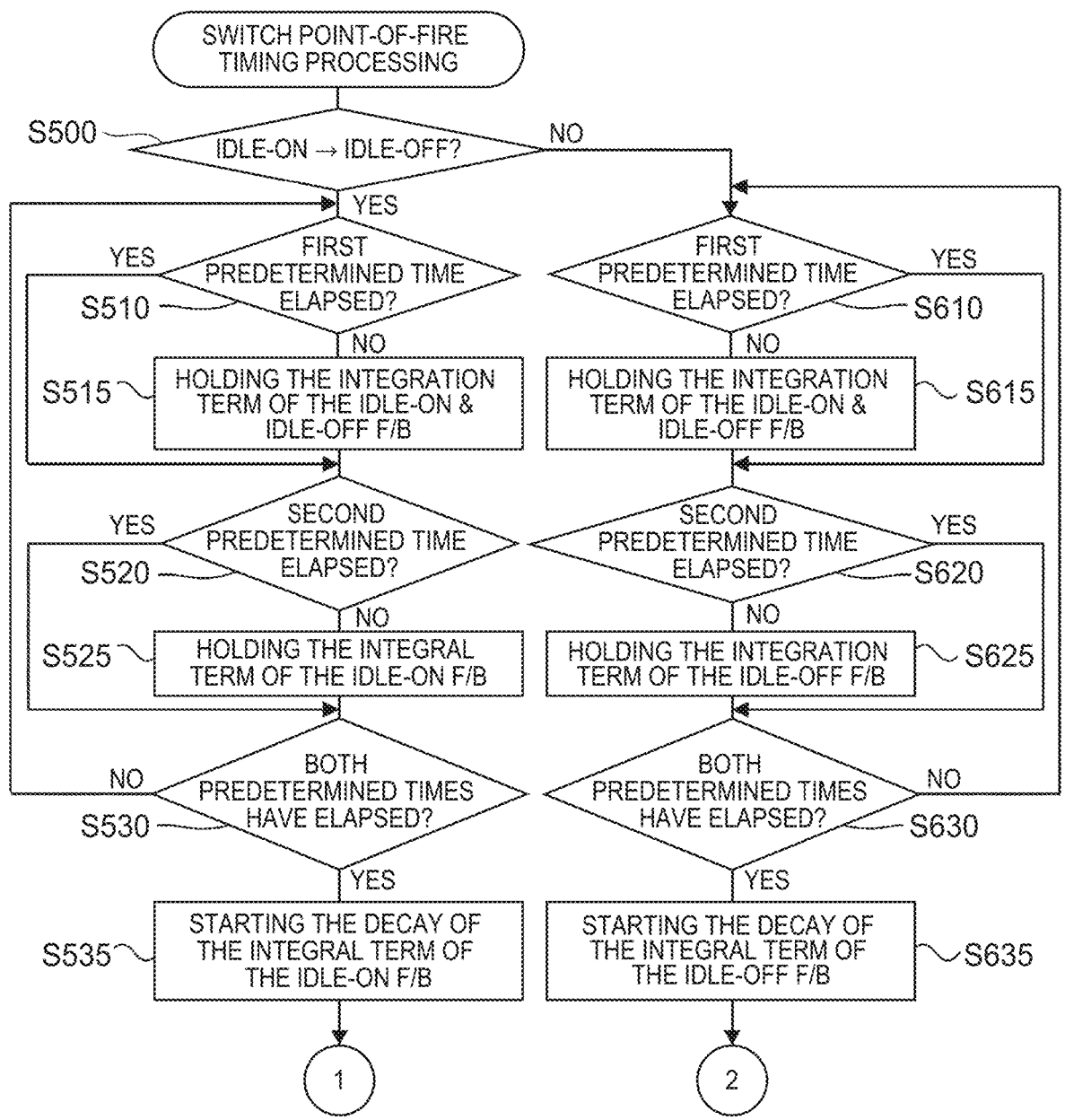
FIGS. 8A and 8B show a flow chart illustrating an exemplary switching timing process for switching the ignition timing Tp of the rapid catalyst warm-up control at the time of switching between idle-on and idle-off.
Figure 8B:
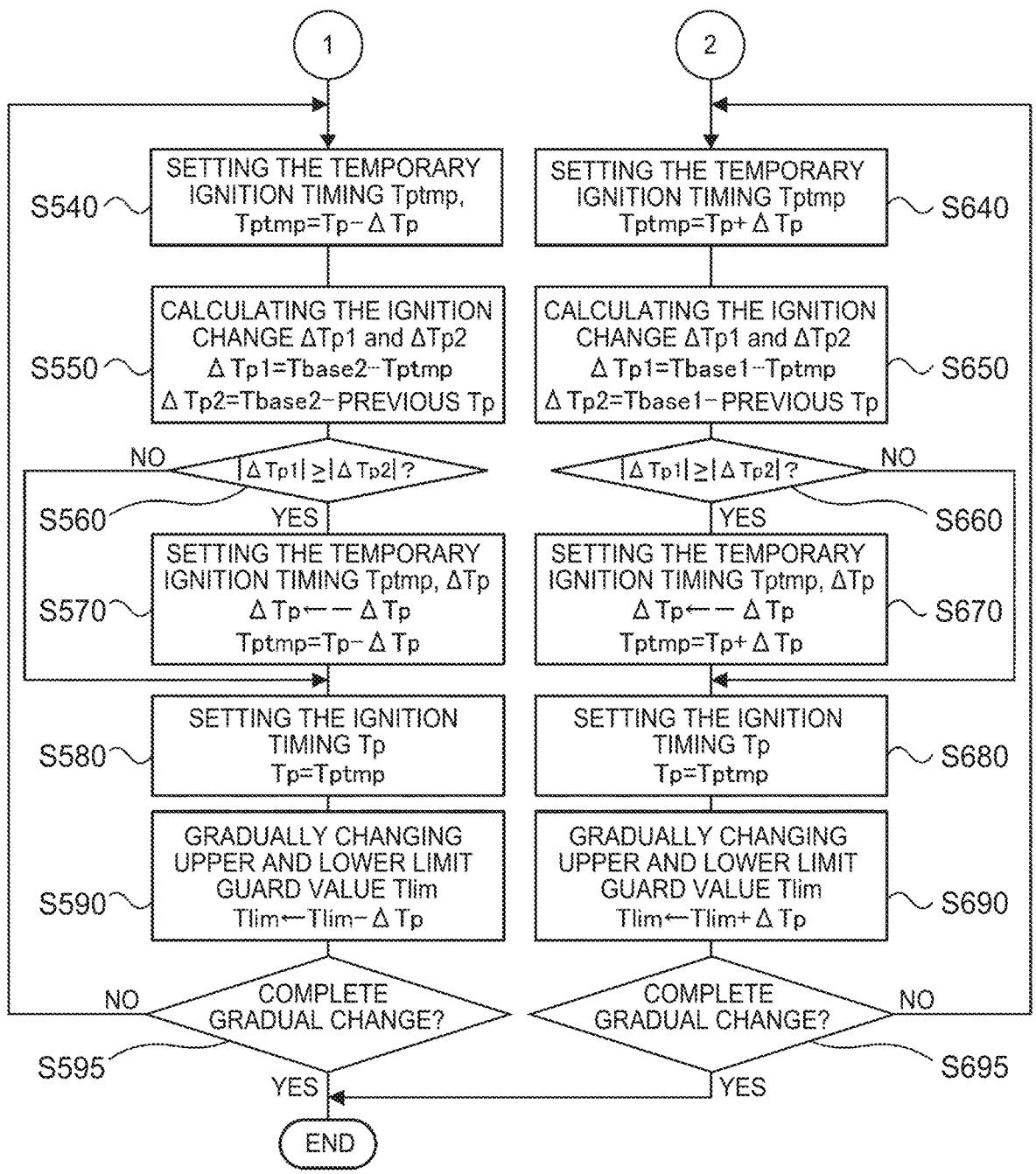

Next, a switching operation of the ignition timing Tp at the time of switching to the rapid catalyst warm-up control for idle-off by being idle-off during execution of the rapid catalyst warm-up control for idle-on and a switching operation of the ignition timing Tp at the time of switching to the rapid catalyst warm-up control for idle-on by being idle-on during execution of the rapid catalyst warm-up control for idle-off will be described. FIGS. 8A and 8B show a flow chart illustrating an exemplary switching time-of-fire timing process executed when switching between the ignition timing Tp of the rapid catalyst warm-up control for idle-on and the ignition timing Tp of the rapid catalyst warm-up control for idle-off.

When the switching timing process is executed, it is first determined whether to switch from idle-on to idle-off or from idle-off to idle-on (step S500).

When it is determined that the switching from the idle-on to the idle-off is performed, it is determined whether or not the first predetermined time has elapsed since the switching from the idle-on to the idle-off (step S510), and when it is determined that the first predetermined time has not elapsed, the integration term of the feedback control in the rapid catalyst warm-up control for the idle-on and the integration term of the feedback control in the rapid catalyst warm-up control for the idle-off are held (step S515). As the first predetermined time, a time required for switching the torque Tm1 of the motor MG1 from the torque at the time of idle-on to the torque at the time of idle-off in accordance with the switching from the idle-on to the idle-off can be used.

Subsequently, it is determined whether or not the second predetermined time has elapsed since switching from idle-on to idle-off (step S520), and when it is determined that the second predetermined time has not elapsed, the integral term of the feedback control in the rapid catalyst warm-up control for idle-on is held (step S525). As the second predetermined time, the throttle opening degree changes with the switching from idle-on to idle-off, and it is possible to use a time required for the intake air amount Qa and the load factor KL to be stabilized with respect to the change in the throttle opening degree. The second predetermined time period may be longer or shorter than the first predetermined time period due to an introduction of the engine 22 or the like.

Further, it is determined whether both the first predetermined time and the second predetermined time has elapsed after switching from the idle-on to the idle-off (step S530), when it is determined that both the first predetermined time and the second predetermined time has elapsed, to start attenuating the integral term of the feedback control in the rapid catalyst warm-up control for the idle-on (step S535). That is, the third term on the right side in the above-described equations (1) and (2) is attenuated toward the value 0. The amount of attenuation will be described later. When it is determined in step S530 that both of the first predetermined time and the second predetermined time has not elapsed, the process returns to the process of determining whether or not the first predetermined time has elapsed after switching from the idle-on state to the idle-off state in step S510.

Processing of step S510~S535, the integration term of the feedback control in the rapid catalyst warm-up control for idle-on becomes a process of attenuating after holding until both the first predetermined time and the second predetermined time elapses, the integration term of the feedback control in the rapid catalyst warm-up control for idle-off becomes a process of holding until the first predetermined time elapses.

When both of the first predetermined time and the second predetermined time elapses after switching from the idle-on to the idle-off, and the decay of the integral term of the feedback control in the rapid catalyst warm-up control for the idle-on is started, a value obtained by retarding the ignition timing gradual variation ΔTp by the present ignition timing Tp is set as the temporary ignition timing Tptmp (step S540). In the drawing, the retardation direction is represented as a negative Tptmp=Tp−ΔTp. The ignition timing slow variate ΔTp is a change amount when the ignition timing Tp is changed little by little. Then, the first ignition timing change amount ΔTp1 and the second ignition timing change amount ΔTp2 are calculated by subtracting the temporary ignition timing Tptmp and the previous ignition timing Tp from the ignition timing base value Tbase2 of the rapid catalyst warm-up control for idle-off (step S550), and it is determined whether the absolute value of the first ignition timing change amount ΔTp1 is equal to or greater than the absolute value of the second ignition timing change amount ΔTp2 (step S560). This determination is made as to whether or not the temporary ignition timing Tptmp changes toward the ignition timing base value Tbase2 compared to the previous ignition timing Tp.

When it is determined in step S560 that the absolute value of the first ignition timing change amount ΔTp1 is equal to or greater than the absolute value of the second ignition timing change amount ΔTp2, it is determined that the temporary ignition timing Tptmp has not changed toward the ignition timing base value Tbase2, and the sign of the ignition timing slow change amount ΔTp is changed to reset the temporary ignition timing Tptmp (step S570). When the temporary ignition timing Tptmp is reset in this way, the temporary ignition timing Tptmp is set as the ignition timing Tp (step S580), and the upper and lower limit guard values Tlim of the ignition timing Tp are retarded by the ignition timing slow variation ΔTp (step S590). Then, it is determined whether or not the gradual change of the ignition timing Tp has been completed (step S595), and when it is determined that the gradual change of the ignition timing Tp has not been completed, the process returns to the process of determining whether or not a predetermined period has elapsed from the beginning of the switching from the idle-on to the idle-off of the step S520. Therefore, the process of the step S520~S595 is repeatedly executed until the gradual change of the ignition timing Tp is completed, and each time the ignition timing Tp is repeatedly executed, the ignition timing gradual change ΔTp is retarded by the ignition timing gradual change ΔTp toward the ignition timing base value Tbase2, and the upper and lower limit guard values Tlim are retarded by the ignition timing gradual change ΔTp toward the upper and lower limit guard values Tlim2 of the ignition timing Tp in the rapid catalyst warm-up control for idle-off. Incidentally, the completion of the gradual change of the ignition timing Tp can be performed by determining whether or not the difference between the ignition timing Tp and the ignition timing base value Tbase2 is less than the ignition timing change amount ΔTp. The upper and lower limit guard value Tlim2 is a value determined in advance that the advance angle or the retard angle of the ignition timing Tp is not preferable in the rapid catalyst warm-up control for idle-off, and in the embodiment, a value obtained by advancing and retarding the ignition timing base value Tbase2 by a predetermined angle in the rapid catalyst warm-up control for idle-off is used.

When it is determined in step S560 that the absolute value of the first ignition timing change amount ΔTp1 is less than the absolute value of the second ignition timing change amount ΔTp2, it is determined that the temporary ignition timing Tptmp is changing toward the ignition timing base value Tbase2, and the temporary ignition timing Tptmp is set as the ignition timing Tp (step S580). Then, the upper and lower limit guard values Tlim of the ignition timing Tp are retarded by the ignition timing gradual variation ΔTp (step S590), and it is determined whether or not the gradual variation of the ignition timing Tp has been completed (step S595), and when it is determined that the gradual variation of the ignition timing Tp has not been completed, the process returns to the process of determining whether or not a predetermined time has elapsed from the beginning of the switching from the idle-on to the idle-off of the step S520. Also in this case, the process of the step S520~S595 is repeatedly executed until the gradual change of the ignition timing Tp is completed, and the ignition timing Tp is retarded by the ignition timing gradual change amount ΔTp toward the ignition timing base value Tbase2, and the upper and lower limit guard values Tlim are retarded by the ignition timing gradual change amount ΔTp toward the lower limit guard value Tlim2 of the ignition timing Tp in the rapid catalyst warm-up control for idle-off.

When it is determined that the switching from the idle-off to the idle-on is performed in the step S500, it is determined whether or not the first predetermined time has elapsed since the switching from the idle-off to the idle-on (step S610), and when it is determined that the first predetermined time has not elapsed, the integration term of the feedback control in the rapid catalyst warm-up control for the idle-on and the integration term of the feedback control in the rapid catalyst warm-up control for the idle-off are held (step S615). As the first predetermined time, the time required to switch the torque Tm1 of the motor MG1 from the torque at the time of idle-off to the torque at the time of idle-on in accordance with the switching from the idle-off to the idle-on can be used, and may be the same time as the first predetermined time in the aforementioned S510 of steps or may be a different time.

Subsequently, it is determined whether or not the second predetermined time has elapsed since switching from idle-off to idle-on (step S620), and when it is determined that the second predetermined time has not elapsed, the integral term of the feedback control in the rapid catalyst warm-up control for idle-off is held (step S625). As the second predetermined time, the throttle opening degree changes with the switching from idle-off to idle-on, and the time required for the intake air amount Qa and the load factor KL to stabilize with respect to the change in the throttle opening degree can be used, and may be the same time as the second predetermined time in the above-described S520 of steps or may be a different time. The second predetermined time period may be longer or shorter than the first predetermined time period due to the introduction of the engine 22 or the like.

Further, it is determined whether both the first predetermined time and the second predetermined time has elapsed after switching from the idle-off to the idle-on (step S630), when it is determined that both the first predetermined time and the second predetermined time has elapsed, it starts attenuating the integral term of the feedback control in the rapid catalyst warm-up control for the idle-off (step S635). That is, the third term on the right side in the above-described equations (5) and (6) is attenuated toward the value 0. The amount of attenuation in this case will also be described later. When it is determined in step S630 that both the first predetermined time and the second predetermined time have not elapsed, the process returns to the process of determining whether or not the first predetermined time has elapsed since the idle-on state was switched from the idle-off state in step S610.

Processing of step S610~S635, the integration term of the feedback control in the rapid catalyst warm-up control for idle-off becomes a process of attenuating after holding until both the first predetermined time and the second predetermined time elapses, the integration term of the feedback control in the rapid catalyst warm-up control for idle-on becomes a process of holding until the first predetermined time elapses.

When both of the first predetermined time and the second predetermined time has elapsed since switching from idle-off to idle-on, and the decay of the integral term of the feedback control in the rapid catalyst warm-up control for idle-off is started, a value obtained by advancing the ignition timing gradual variation ΔTp to the present ignition timing Tp is set as the temporary ignition timing Tptmp (step S640). In the drawing, Tptmp=Tp+ΔTp is represented as positive in the advance direction. Then, the first ignition timing change amount ΔTp1 and the second ignition timing change amount ΔTp2 are calculated by subtracting the temporary ignition timing Tptmp and the previous ignition timing Tp from the ignition timing base value Tbase1 of the rapid catalyst warm-up control for idle-on (step S650), and it is determined whether or not the absolute value of the first ignition timing change amount ΔTp1 is equal to or greater than the absolute value of the second ignition timing change amount ΔTp2 (step S660). This determination is made as to whether or not the temporary ignition timing Tptmp changes toward the ignition timing base value Tbase1 compared to the previous ignition timing Tp.

When it is determined in step S660 that the absolute value of the first ignition timing change amount ΔTp1 is equal to or greater than the absolute value of the second ignition timing change amount ΔTp2, it is determined that the temporary ignition timing Tptmp has not changed toward the ignition timing base value Tbase1, and the sign of the ignition timing slow change amount ΔTp is changed to reset the temporary ignition timing Tptmp (step S670). When the temporary ignition timing Tptmp is reset in this way, the temporary ignition timing Tptmp is set as the ignition timing Tp (step S680), and the upper and lower limit guard values Tlim of the ignition timing Tp are advanced by the ignition timing slow variable ΔTp (step S690). Then, it is determined whether or not the gradual change of the ignition timing Tp has been completed (step S695), and when it is determined that the gradual change of the ignition timing Tp has not been completed, the process returns to the process of determining whether or not a predetermined period has elapsed from the beginning of the switching from the idle-off to the idle-on of the step S620. Therefore, the process of the step S620~S695 is repeatedly executed until the gradual change of the ignition timing Tp is completed, and each time the ignition timing Tp is repeatedly executed, the ignition timing gradual change amount ΔTp advances toward the ignition timing base value Tbase1, and the upper and lower limit guard value Tlim advances toward the upper and lower limit guard value Tlim1 of the ignition timing Tp in the rapid catalyst warm-up control for idle-on by the ignition timing gradual change amount ΔTp. Incidentally, the completion of the gradual change of the ignition timing Tp can be performed based on whether or not the difference between the ignition timing Tp and the ignition timing base value Tbase1 is less than the ignition timing change ΔTp. The upper and lower limit guard value Tlim1 is a value determined in advance that the advance angle or the retard angle of the ignition timing Tp is not preferable in the rapid catalyst warm-up control for idle-on, and in the embodiment, a value obtained by advancing and retarding the ignition timing base value Tbase1 by a predetermined angle in the rapid catalyst warm-up control for idle-on is used.

When it is determined in step S660 that the absolute value of the first ignition timing change amount ΔTp1 is less than the absolute value of the second ignition timing change amount ΔTp2, it is determined that the temporary ignition timing Tptmp is changing toward the ignition timing base value Tbase1, and the temporary ignition timing Tptmp is set as the ignition timing Tp (step S680). Then, the upper and lower limit guard values Tlim of the ignition timing Tp are advanced by the ignition timing gradual change amount ΔTp (step S690), and it is determined whether or not the gradual change of the ignition timing Tp is completed (step S695), and when it is determined that the gradual change of the ignition timing Tp is not completed, the process returns to the process of determining whether or not a predetermined time has elapsed from the beginning of the switching from the idle-on to the idle-off of the step S620. Also in this case, the process of the step S620~S695 is repeatedly executed until the gradual change of the ignition timing Tp is completed, and each time the ignition timing Tp is repeatedly executed, the ignition timing gradual change amount ΔTp advances toward the ignition timing base value Tbase1, and the upper and lower limit guard value Tlim advances toward the upper and lower limit guard value Tlim1 of the ignition timing in the rapid catalyst warm-up control for idle-on by the ignition timing gradual change amount ΔTp.

Figure 9:
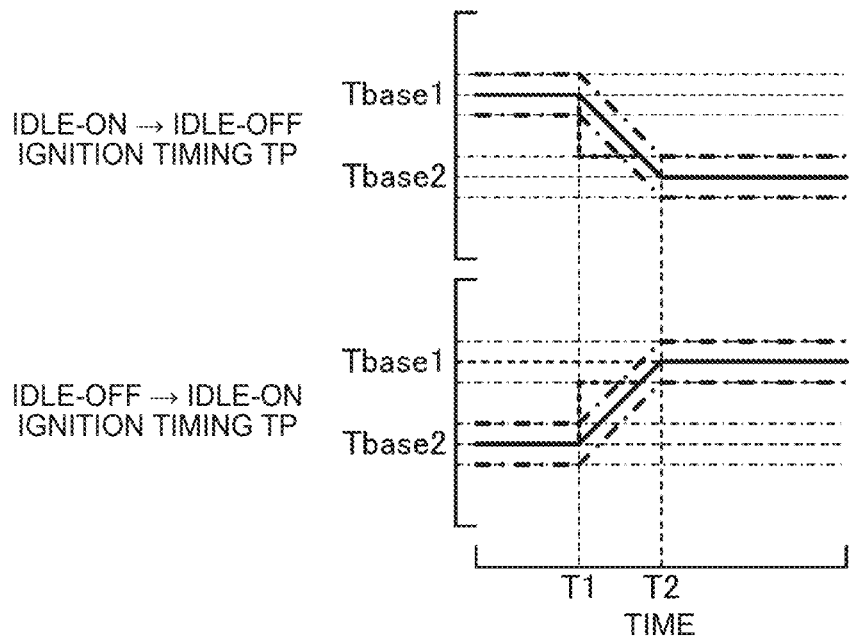
FIG. 9 is an explanatory diagram illustrating an exemplary state of a change in the ignition timing Tp and the upper and lower limit guard values Tlim when the idle-on state and the idle-off state are switched.

FIG. 9 is an explanatory diagram illustrating an exemplary state of a change in the ignition timing Tp and the upper and lower limit guard values Tlim when the idle-on state and the idle-off state are switched. In the drawing, a thick solid line represents the ignition timing Tp, a thick dashed line represents the upper and lower limit guard values Tlim, a thick dashed line represents the ignition timing Tp of the comparative example, and a thin dashed line represents the upper and lower limit guard values Tlim1,Tlim2. As a comparative example, the ignition timing Tp was gradually changed, but the upper and lower limit guard values Tlim were not gradually changed. In the drawing, an upward direction indicates an advance angle of the ignition timing Tp, and a downward direction indicates a retard angle of the ignition timing Tp. Consider switching from idle-on to idle-off (upper part of the figure). In the comparative example, in the time T1 where both the first predetermined time and the second predetermined time elapse after switching from the idle-on to the idle-off and the air amount Qa is stabilized, the guard process is immediately performed by the upper limit guard value Tlim2 (the guard value on the upper limit side of the ignition timing base value Tbase2) in the rapid catalyst warm-up control for the idle-off immediately after that, so that the ignition timing Tp suddenly changes to the upper limit guard value Tlim2. In the embodiment, similarly, the ignition timing Tp and the upper and lower limit guard values Tlim gradually retard from the time T1 when the air amount Qa is stabilized. Then, the ignition timing Tp becomes the ignition timing base value Tbase2 in the rapid catalyst warm-up control for idle-off T2 the time at which the gradual change of the ignition timing Tp ends, and the upper and lower limit guard values Tlim also become the upper and lower limit guard values Tlim2 in the rapid catalyst warm-up control for idle-off. Next, consider switching from idle-off to idle-on (lower part of the figure). In the comparative example, since the guard process is immediately performed by the lower limit guard value Tlim1 (the guard value at the lower limit of the ignition timing base value Tbase1) in the rapid catalyst warm-up control for idle-on immediately after the time T1, the ignition timing Tp abruptly changes to the lower limit guard value Tlim1. In the embodiment, the ignition timing Tp and the upper and lower limit guard values Tlim gradually advance from the time T1. Then, the ignition timing Tp becomes the ignition timing base value Tbase1 in the rapid catalyst warm-up control for idle-on in the time T2 at which the gradual change of the ignition timing Tp ends, and the upper and lower limit guard values Tlim also become the upper and lower limit guard values Tlim1 in the rapid catalyst warm-up control for idle-on. As described above, the sudden change in the ignition timing Tp can be suppressed by gradually changing the upper and lower limit guard values Tlim together with the gradual change in the ignition timing Tp.

Figure 10:
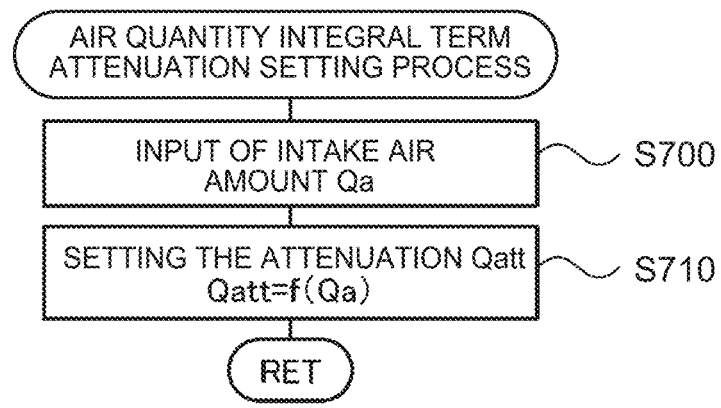
FIG. 10 is a flowchart illustrating an example of an air amount integration term attenuation amount setting process.
Figure 11:
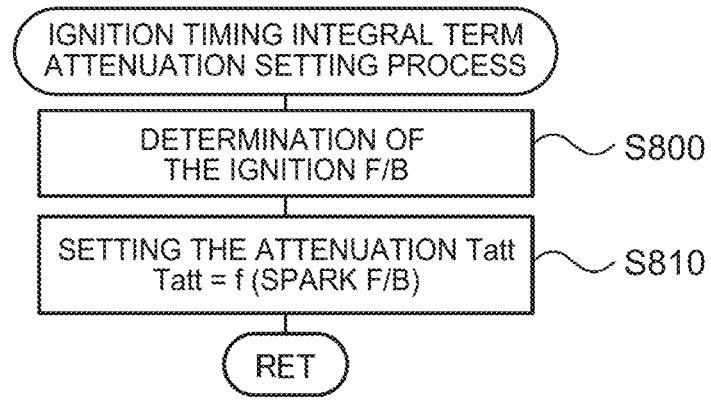
FIG. 11 is a flowchart illustrating an example of an ignition timing integration term attenuation amount setting process.

Next, the steps S535 and S635 of the switching time-of-fire timing process in FIG. 8A will be described. FIG. 10 is a flowchart showing an example of an air amount integral term attenuation amount setting process executed when the attenuation amount of the integral term (the third term on the right side of Equations (2) and (6)) of the relational expression in the feedback control of the air amount Qa is set, and FIG. 11 is a flowchart showing an example of an ignition timing integral term attenuation amount setting process executed when the attenuation amount of the integral term (the third term on the right side of Equations (1) and (5)) of the relational expression in the feedback control of the ignition timing Tp is set. The following will be described in order.

In the air amount integral term attenuation amount setting process, the intake air amount Qa at that time of the engine 22 is inputted (step S700), the attenuation amount Qatt of the integral term (the third term on the right side of the equations (2) and (6)) of the relational expression in the feedback control of the air amount Qa is set based on the intake air amount Qa (step S710), and the process is ended. In the embodiment, the attenuation amount Qatt is set so that the attenuation amount Qatt increases as the intake air amount Qa increases. This is based on the fact that the larger the intake air amount Qa, the larger the energy amount and the warm-up of the engine 22 is also performed.

In the ignition timing integration term attenuation amount setting process, a mode of the present ignition timing feedback control is determined (step S800), a value corresponding to the mode of the ignition timing feedback control is set as the attenuation amount Tatt (step S810), and the process ends. FIG. 12 shows a list of exemplary modes of the ignition timing feedback control and the attenuation Tatt. The mode 1 is a mode in a normal state, that is, a state in which the rapid catalyst warm-up control for idle-on and the rapid catalyst warm-up control for idle-off are stably executed, and a normal value Tat1 (a value for actively attenuating) is used as the attenuation amount Tatt. Tat1 can be determined as appropriate by experimentation, machine-learning, or the like. The mode 0 is a mode in which the rapid catalyst warm-up control for idle-on and the rapid catalyst warm-up control for idle-off are temporarily suspended, and a value Tat0 is used as the damping amount Tatt. In the value Tat0, since the warm-up of the engine 22 proceeds in the mode 0, a value that is relatively aggressively attenuated is used, and a value that is the same as or slightly smaller than the value Tat1 is used. Mode 2 is a mode in which feedback control cannot be performed on the ignition timing Tp immediately after switching from idle-on to idle-off, and 0 is used as the attenuation Tatt. That is, in mode 2, the integral term is retained. The mode 3 is a mode in a state in which combustion deterioration of the engine 22 is occurring (a state in which the rotational speed Ne of the engine 22 is reduced in the idle-on state and a state in which the estimated torque Test of the engine 22 estimated from the torque Tm1 of the motor MG1 is reduced in the idle-off state), and in a state in which it is difficult to perform feedback control but it is not desired to update the integration term (combustion deterioration (1)), and a value of 0 is used as the attenuation amount Tatt. The mode 4 is a mode in which combustion deterioration of the engine 22 is occurring as in the mode 3, but the integral term can also be updated (combustion deterioration (2)), and a Tat4 is used as the attenuation Tatt. Since the value Tat4 is not actively attenuated in the mode 4, a value smaller than the value Tat1 is used. By changing the attenuation Tatt according to the mode of the ignition timing feedback control in this way, it is possible to attenuate the integral term of the relational expression in the feedback control of the ignition timing Tp of the rapid catalyst warm-up control more appropriately.

In hybrid electric vehicle 20 of the above-described embodiment, the rapid catalyst warm-up control for idle-on is executed at the time of idle-on, and the rapid catalyst warm-up control for idle-on is executed at the time of idle-off, which differs from the rapid catalyst warm-up control for idle-on. As a result, it is possible to execute more appropriate rapid catalyst warm-up control at the time of idle-off.

In hybrid electric vehicle 20 of the embodiment, when the rapid catalyst warm-up control for idle-off is executed, feedback control is performed on the air amount Qa and the ignition timing Tp of the engine 22 using the estimated torque Test of the engine 22 estimated based on the torque Tm1 of the motor MG1. This makes it possible to perform rapid catalyst warm-up control for idle-off in a relatively stable operation state of the engine. Further, the feedback control is performed so that the estimated torque Test becomes the converging torque Tref2 when the estimated torque Test reaches less than the threshold Tref1. Accordingly, the feedback control can be performed only when the estimated torque Test reaches less than the threshold Tref1, and the excessive control can be avoided. In addition, it is possible to continue the control of the engine 22 that prioritizes the reduction of the exhaust gas so as not to disrupt the optimum balance between the amount of exhaust gas from the engine 22 and the energy supplied to the catalyst.

In addition, in hybrid electric vehicle 20 of the embodiment, when the engine speed Ne of the engine 22 is increased by the motor MG1 while the rapid catalyst warm-up control for idle-off is being executed, the feedback control based on the estimated torque Test of the engine 22 is not performed (prohibited). Thus, it is possible to suppress the engine speed Ne of the engine 22 from becoming unstable by performing the feedback control while the engine speed Ne of the engine 22 is being increased by the motor MG1.

In hybrid electric vehicle 20 of the embodiment, when switching from the rapid catalyst warm-up control for idle-on to the rapid catalyst warm-up control for idle-off or conversely from the rapid catalyst warm-up control for idle-off to the rapid catalyst warm-up control for idle-on, the integral term of the feedback control with respect to the ignition timing Tp is held until the first predetermined time and the second predetermined time elapse. As a result, it is possible to suppress a sudden change in the ignition timing Tp.

In hybrid electric vehicle 20 of the embodiment, when switching from the rapid catalyst warm-up control for idle-on to the rapid catalyst warm-up control for idle-off, or when switching from the rapid catalyst warm-up control for idle-off to the rapid catalyst warm-up control for idle-on to the rapid catalyst warm-up control for idle-on, when the ignition timing Tp to the ignition timing gradual variation ΔTp or the retarded temporary ignition timing Tptmp does not change toward the ignition timing base value Tbase1,Tbase2 in the control after the switching, the sign of the ignition timing gradual variation ΔTp is changed to set the temporary ignition timing Tptmp, and this is used as the ignition timing Tp. In this way, it is possible to suppress the ignition timing Tp from changing in a direction other than the direction toward the ignition timing base value Tbase1,Tbase2 after the switching.

In hybrid electric vehicle 20 of the embodiment, when switching from the rapid catalyst warm-up control for idle-on to the rapid catalyst warm-up control for idle-off or conversely switching from the rapid catalyst warm-up control for idle-off to the rapid catalyst warm-up control for idle-on, after the first predetermined time or the second predetermined time has elapsed, the ignition timing Tp is gradually changed toward the ignition timing base value Tbase1,Tbase2 after the switching. As a result, it is possible to suppress a sudden change in the ignition timing Tp. Further, when switching from the rapid catalyst warm-up control for idle-on to the rapid catalyst warm-up control for idle-off, or conversely, switching from the rapid catalyst warm-up control for idle-off to the rapid catalyst warm-up control for idle-on, the same as the ignition timing Tp, the engine control that prioritizes the reduction of exhaust emissions can be continued so as not to disrupt the optimum balance between the amount of exhaust gas from the engine and the amount of energy supplied to the catalyst. The upper and lower limit guard value Tlim changes gradually toward the upper and lower limit guard value Tlim1,Tlim2 after switching. This makes it possible to prevent the ignition timing Tp from suddenly changing due to the upper and lower limit guard values Tlim1,Tlim2 after the switching, even though the ignition timing Tp gradually changes toward the ignition timing base value Tbase1,Tbase2 after the switching.

In hybrid electric vehicle 20 of the embodiment, the engine 22 is operated at a predetermined engine speed Nset both in the rapid catalyst warm-up control for idle-on and in the rapid catalyst warm-up control for idle-off, but the engine speed Ne of the engine 22 may differ between the rapid catalyst warm-up control for idle-on and the rapid catalyst warm-up control for idle-off. That is, in the rapid catalyst warm-up control for idle-on, the engine 22 may be operated at a first predetermined engine speed Nset1, and in the rapid catalyst warm-up control for idle-off, the engine 22 may be operated at a second predetermined engine speed Nset2 that differs from the first predetermined engine speed Nset1.

In hybrid electric vehicle 20 of the embodiment, the in-cylinder injection valve 127 is disposed substantially in the center of the top portion of the combustion chamber 129 as the engine 22, but an engine in which the in-cylinder injection valve 127 is disposed on the side wall of the combustion chamber 129 may be used.

In hybrid electric vehicle 20 of the embodiment, the engine 22 includes the port injection valve 126 and the in-cylinder injection valve 127, but an engine including only the in-cylinder injection valve without the port injection valve may be used.

In hybrid electric vehicle 20 of the embodiment, the battery 50 is used as the electric power storage device, but any device capable of storing power may be used, and a capacitor or the like may be used.

Although hybrid electric vehicle 20 includes an engine ECU 24, a motor ECU 40, a battery ECU 52, and a HVECU 70, at least two of them may be configured as a single electronic control unit.

In the embodiment, the present disclosure is applied to a hybrid electric vehicle 20 including an engine 22, a motor MG1,MG2, and a planetary gear 30. However, hybrid electric vehicle may have any configuration as long as it includes an engine, a first motor capable of generating electric power mechanically connected to an output shaft of the engine, and a second motor capable of inputting and outputting driving power.

The correspondence between the main elements of the embodiment and the main elements of the disclosure described in SUMMARY will be described. In the embodiment, the exhaust gas control device 135 corresponds to the "exhaust gas control device", the engine 22 corresponds to the "engine", the motor MG1 corresponds to the "first electric motor", the motor MG2 corresponds to the "second electric motor", the battery 50 corresponds to the "electric power storage device", and the engine ECU 24, the motor ECU 40, and HVECU 70 correspond to the "control device".

As for the correspondence between the main elements of the embodiment and the main elements of the disclosure described in SUMMARY, since the embodiment is an example for specifically describing a mode for carrying out the disclosure described in SUMMARY, the embodiment does not limit the elements of the disclosure described in SUMMARY. In other words, the interpretation of the disclosure described in SUMMARY should be performed based on the description in SUMMARY, and the embodiment is merely a specific example of the disclosure described in SUMMARY.

Although the modes for carrying out the disclosure have been described above with the embodiment, the disclosure is not limited to the embodiment, and may be embodied in various modes without departing from the scope of the disclosure.

The present disclosure is applicable to the manufacturing industry of a hybrid electric vehicle and the like.

What is claimed is:
1. A hybrid electric vehicle, comprising:
an engine including an exhaust gas control device provided with a catalyst that controls exhaust gas and an in-cylinder injection valve, the exhaust gas control device being attached to an exhaust system;
a first electric motor that is mechanically connected to an output shaft of the engine and that is configured to generate electricity;
a second electric motor that is configured to input and output power for traveling;
an electric power storage device that is configured to exchange electric power with the first electric motor and the second electric motor; and
a control device configured to control the engine, the first electric motor, and the second electric motor,
wherein
the control device is configured to, while rapid catalyst warm-up, in which fuel is injected in a compression stroke or an expansion stroke in the engine and the engine is operated with an ignition timing being retarded so as to warm up a catalyst of the exhaust gas control device, is being performed during idle-off in which an idling operation of the engine is not instructed and the engine is operated,
control the engine and the first electric motor to operate the engine at a first predetermined engine speed while the engine outputs predetermined torque, and control the second electric motor to output a driving force based on a required driving force for travelling.

2. The hybrid electric vehicle according to claim 1, wherein the control device is configured to, while the rapid catalyst warm-up is being performed during the idle-off, execute a first feedback control that uses a proportional term and an integral term with respect to an air amount and/or the ignition timing of the engine using estimated engine torque estimated based on output torque of the first electric motor.

3. The hybrid electric vehicle according to claim 2, wherein the control device is configured to, in response to the estimated engine torque becoming less than reference torque that is smaller than the predetermined torque, execute the first feedback control to cause the estimated engine torque to become equal to or more than the reference torque.

4. The hybrid electric vehicle according to claim 2, wherein the control device is configured to, while the rapid catalyst warm-up is being performed during idle-on in which the idling operation of the engine is instructed,
control the engine and the first electric motor to cause the engine to autonomously operate at a second predetermined engine speed,
control the second electric motor to output the driving force based on the required driving force for travelling, and
execute a second feedback control that uses the proportional term and the integral term with respect to the air amount and/or the ignition timing of the engine using an engine speed of the engine.

5. The hybrid electric vehicle according to claim 4, wherein the control device is configured to:
attenuate an integral term in the first feedback control in response to the idle-off being switched to the idle-on while the rapid catalyst warm-up is being performed; and
attenuate an integral term in the second feedback control in response to the idle-on being switched to the idle-off while the rapid catalyst warm-up is being performed.

6. The hybrid electric vehicle according to claim 5, wherein the control device is configured to:
attenuate an integral term of feedback control with respect to the air amount based on an intake air amount at a current time; and
attenuate an integral term of feedback control with respect to the ignition timing based on a mode predetermined for a plurality of states.

7. The hybrid electric vehicle according to claim 2, wherein the control device is configured to prohibit the first feedback control in response to an engine speed being increased by the first electric motor.

8. The hybrid electric vehicle according to claim 4, wherein the control device is configured to
retain an integral term of feedback control with respect to the ignition timing for a predetermined time in response to the idle-off being switched to the idle-on while the rapid catalyst warm-up is being performed, and
retain the integral term of the feedback control with respect to the ignition timing for the predetermined time in response to the idle-on being switched to the idle-off while the rapid catalyst warm-up is being performed.

9. The hybrid electric vehicle according to claim 4, wherein the control device is configured to,
in a case where the ignition timing is corrected in a direction different from an ignition timing base value after feedback control is switched accompanied by that the idle-off is switched to the idle-on while the rapid catalyst warm-up is being executed or that the idle-on is switched to the idle-off while the rapid catalyst warm-up is being executed, correct an integral term of the feedback control after the feedback control is switched to correct the ignition timing in a direction of the ignition timing base value.

10. The hybrid electric vehicle according to claim 4, wherein the control device is configured to, in response to feedback control being switched accompanied by that the idle-off is switched to the idle-on while the rapid catalyst warm-up is being performed or that the idle-on is switched to the idle-off while the rapid catalyst warm-up is being executed,
gradually change the ignition timing to an ignition timing base value after the feedback control is switched.

11. The hybrid electric vehicle according to claim 10, wherein the control device is configured to, in response to the feedback control being switched accompanied by that the idle-off is switched to the idle-on while the rapid catalyst warm-up is being performed or that the idle-on is switched to the idle-off while the rapid catalyst warm-up is being executed,
gradually change upper and lower limit guard values set before switching the feedback control to upper and lower limit guard values set after the feedback control is switched.

* * * * *